United States Patent
Brauer et al.

(10) Patent No.: US 11,328,435 B2
(45) Date of Patent: May 10, 2022

(54) IMAGE ALIGNMENT SETUP FOR SPECIMENS WITH INTRA- AND INTER-SPECIMEN VARIATIONS USING UNSUPERVISED LEARNING AND ADAPTIVE DATABASE GENERATION METHODS

(71) Applicant: KLA Corporation, Milpitas, CA (US)

(72) Inventors: Bjorn Brauer, Beaverton, OR (US); Huan Jin, Dublin, CA (US); Xiaochun Li, San Jose, CA (US)

(73) Assignee: KLA Corp., Milpitas, CA (US)

( * ) Notice: Subject to any disclaimer, the term of this patent is extended or adjusted under 35 U.S.C. 154(b) by 0 days.

(21) Appl. No.: 17/334,179

(22) Filed: May 28, 2021

(65) Prior Publication Data

US 2021/0383557 A1 Dec. 9, 2021

Related U.S. Application Data

(60) Provisional application No. 63/035,850, filed on Jun. 8, 2020.

(51) Int. Cl.
*G06K 9/00* (2006.01)
*G06T 7/32* (2017.01)
(Continued)

(52) U.S. Cl.
CPC .............. *G06T 7/32* (2017.01); *G06T 7/001* (2013.01); *G06T 7/344* (2017.01); *G06T 2207/20081* (2013.01); *G06T 2207/30148* (2013.01)

(58) Field of Classification Search
CPC ........... G06T 7/32; G06T 7/001; G06T 7/344; G06T 2207/20081; G06T 2207/30148
See application file for complete search history.

(56) References Cited

U.S. PATENT DOCUMENTS

| | | | | |
|---|---|---|---|---|
| 5,515,453 A | * | 5/1996 | Hennessey | G06K 9/4685 382/141 |
| 6,421,553 B1 | * | 7/2002 | Costa | A61B 5/0059 356/302 |

(Continued)

FOREIGN PATENT DOCUMENTS

| KR | 10-2004-0026157 | 3/2004 |
|---|---|---|
| KR | 10-2018-0116406 | 10/2018 |

OTHER PUBLICATIONS

International Search Report and Written Opinion for PCT/US2021/035554 dated Sep. 23, 2021.

(Continued)

*Primary Examiner* — Samir A Ahmed
(74) *Attorney, Agent, or Firm* — Ann Marie Mewherter

(57) ABSTRACT

Methods and systems for determining one or more alignment parameters for use in a process performed on a specimen are provided. One method includes determining measures of similarity between images generated by an imaging system for corresponding locations in each of two or more pairs of dies on a specimen and performing cluster analysis based on the determined measures of similarity to identify the images that are most similar to each other and to assign different subsets of the images that are most similar to each other to different die clusters, respectively. The method also includes separately determining one or more alignment parameters for two or more of the different die clusters. The one or more alignment parameters are used for aligning images generated by the imaging system for the specimen or another specimen to a common reference.

28 Claims, 8 Drawing Sheets

(51) Int. Cl.
*G06T 7/00* (2017.01)
*G06T 7/33* (2017.01)

(56) References Cited

U.S. PATENT DOCUMENTS

| | | | |
|---|---|---|---|
| 7,570,796 B2 | 8/2009 | Zafar et al. | |
| 7,676,077 B2 | 3/2010 | Kulkarni et al. | |
| 8,126,255 B2 | 2/2012 | Bhaskar et al. | |
| 8,664,594 B1 | 4/2014 | Jiang et al. | |
| 8,692,204 B2 | 4/2014 | Kojima et al. | |
| 8,698,093 B1 | 4/2014 | Gubbens et al. | |
| 8,716,662 B1 | 5/2014 | MacDonald et al. | |
| 9,222,895 B2 | 12/2015 | Duffy et al. | |
| 9,830,421 B2 | 11/2017 | Bhattacharyya et al. | |
| 10,572,988 B1* | 2/2020 | Chaturvedi | G06T 19/20 |
| 10,620,135 B2 | 4/2020 | Brauer | |
| 10,698,325 B2 | 6/2020 | Brauer | |
| 11,120,546 B2* | 9/2021 | Brauer | G06T 5/002 |
| 2004/0057611 A1 | 3/2004 | Lee et al. | |
| 2005/0195398 A1* | 9/2005 | Adel | B82Y 10/00 356/401 |
| 2013/0129189 A1 | 5/2013 | Wu et al. | |
| 2013/0216121 A1* | 8/2013 | Sasajima | H01J 37/28 382/145 |
| 2013/0336573 A1* | 12/2013 | Dalia-Torre | G06T 7/001 382/145 |
| 2016/0110858 A1* | 4/2016 | Liu | G06K 9/6218 382/149 |
| 2017/0140516 A1* | 5/2017 | Maher | G06T 7/11 |
| 2017/0161888 A1 | 6/2017 | Banerjee et al. | |
| 2019/0133693 A1* | 5/2019 | Mahfouz | A61B 6/5229 |
| 2019/0154593 A1 | 5/2019 | Urano et al. | |
| 2019/0227001 A1* | 7/2019 | Cho | G01N 21/9501 |
| 2019/0361354 A1 | 11/2019 | Habets | |
| 2020/0226744 A1* | 7/2020 | Cohen | G06T 7/11 |
| 2021/0056412 A1* | 2/2021 | Jung | G06N 3/0445 |
| 2021/0090229 A1 | 3/2021 | Brauer et al. | |
| 2021/0272273 A1 | 9/2021 | Brauer | |

OTHER PUBLICATIONS

Goodfellow et al., "Generative Adversarial Nets," arXiv:1406.2661, Jun. 10, 2014, 9 pages.
Isola et al., "Image-to-Image Translation with Conditional Adversarial Networks," arXiv:1611.07004v2, Nov. 22, 2017, 17 pages.
Kingma et al., "Semi-supervised Learning with Deep Generative Models," NIPS 2014, Oct. 31, 2014, pp. 1-9.
Makhzani et al., "Adversarial Autoencoders," arXiv:1511.05644v2, May 25, 2016, 16 pages.
Mirza et al., "Conditional Generative Adversarial Nets," arXiv:1411.1784, Nov. 6, 2014, 7 pages.
U.S. Appl. No. 17/170,688 by Brauer filed Jan. 8, 2021 (submitted as U.S. Patent Application Publication No. 2021/0272273 published Sep. 2, 2021).
U.S. Appl. No. 17/308,878 by Brauer et al. filed May 5, 2021.

\* cited by examiner

IMAGE ALIGNMENT SETUP FOR SPECIMENS WITH INTRA- AND INTER-SPECIMEN VARIATIONS USING UNSUPERVISED LEARNING AND ADAPTIVE DATABASE GENERATION METHODS

BACKGROUND OF THE INVENTION

1. Field of the Invention

The present invention generally relates to image alignment setup for specimens with intra- and inter-specimen variations. Certain embodiments relate to methods and systems for determining one or more alignment parameters for use in a process performed on a specimen.

2. Description of the Related Art

The following description and examples are not admitted to be prior art by virtue of their inclusion in this section.

An integrated circuit (IC) design may be developed using a method or system such as electronic design automation (EDA), computer aided design (CAD), and other IC design software. Such methods and systems may be used to generate the circuit pattern database from the IC design. The circuit pattern database includes data representing a plurality of layouts for various layers of the IC. Data in the circuit pattern database may be used to determine layouts for a plurality of reticles. A layout of a reticle generally includes a plurality of polygons that define features in a pattern on the reticle. Each reticle is used to fabricate one of the various layers of the IC. The layers of the IC may include, for example, a junction pattern in a semiconductor substrate, a gate dielectric pattern, a gate electrode pattern, a contact pattern in an interlevel dielectric, and an interconnect pattern on a metallization layer.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as ICs. As design rules shrink, however, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically.

Inspection systems and methods are increasingly being designed to focus on the relationship between defect and design since it is the impact on the design for a specimen that will determine whether and how much a defect matters. For example, some methods have been developed for aligning inspection and design coordinates. One such method depends on the accuracy of the inspection system coordinate registration to design. Another such method involves conducting post-processing alignment on the inspection image patch and associated design clip.

Some currently used methods perform patch-to-design alignment (PDA) training based on a setup die on a setup wafer, and a physics-based model is used to render the images, as shown in FIG. 10. For example, as shown in step 1000 of FIG. 10, the currently used methods may scan a specimen to find alignment targets. As shown in step 1002, the methods may acquire design for each target. Using images generating during the scanning and the design acquired for each target, the currently used methods may learn image rendering parameters from example targets, as shown in step 1004. The currently used methods may then render an image from design at each target, as shown in step 1006, using the learned image rendering parameters. As shown in step 1008, the currently used methods may align the rendered image and specimen image at each target. The currently used methods may then determine design-to-image offsets for each target, as shown in step 1010, and save the targets and offsets to a database for runtime inspection, as shown in step 1012. The runtime PDA process may then be performed in any suitable manner.

While the currently used methods for setting up and performing PDA have proved useful in a number of applications, there are a number of disadvantages to such methods and systems. For example, intra-wafer and inter-wafer variations are not considered in currently used methods for setting up PDA. If there are significant changes in the images during runtime, then alignment will fail or produce less accurate results.

Accordingly, it would be advantageous to develop systems and methods for determining one or more alignment parameters for use in a process performed on a specimen that do not have one or more of the disadvantages described above.

SUMMARY OF THE INVENTION

The following description of various embodiments is not to be construed in any way as limiting the subject matter of the appended claims.

One embodiment relates to a system configured to determine one or more alignment parameters for use in a process performed on a specimen. The system includes one or more computer subsystems configured for determining measures of similarity between images generated by an imaging system for corresponding locations in each of two or more pairs of dies on a specimen. The one or more computer subsystems are also configured for performing cluster analysis based on the determined measures of similarity to identify the images that are most similar to each other and to assign different subsets of the images that are most similar to each other to different die clusters, respectively. For two or more of the different die clusters, the one or more computer subsystems are configured for separately determining one or more alignment parameters used for aligning images generated by the imaging system for the specimen or another specimen to a common reference. The one or more computer subsystems are further configured for storing the one or more alignment parameters determined for the two or more of the different die clusters for use in a process performed on the specimen or the other specimen with the imaging system. The system may be further configured as described herein.

Another embodiment relates to a computer-implemented method for determining one or more alignment parameters for use in a process performed on a specimen. The method includes the determining measures of similarity, performing cluster analysis, separately determining one or more alignment parameters, and storing steps described above, which are performed by one or more computer systems. Each of the steps of the method may be performed as described further herein. In addition, the method described above may include any other step(s) of any other method(s) described herein. Furthermore, the method may be performed by any of the systems described herein.

An additional embodiment relates to a non-transitory computer-readable medium storing program instructions executable on one or more computer systems for performing a computer-implemented method for determining one or more alignment parameters for use in a process performed on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
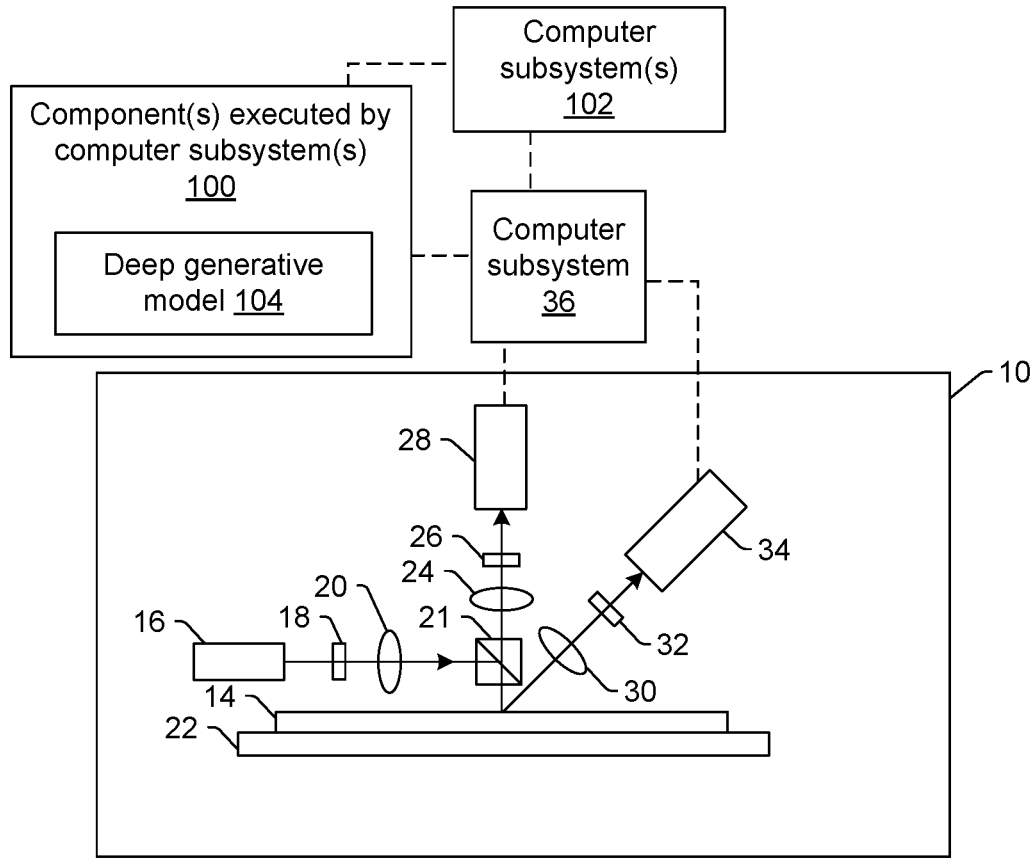
FIGS. 1 and 2 are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The terms "design," "design data," and "design information" as used interchangeably herein generally refer to the physical design (layout) of an IC or other semiconductor device and data derived from the physical design through complex simulation or simple geometric and Boolean operations. The design may include any other design data or design data proxies described in commonly owned U.S. Pat. No. 7,570,796 issued on Aug. 4, 2009 to Zafar et al. and U.S. Pat. No. 7,676,077 issued on Mar. 9, 2010 to Kulkarni et al., both of which are incorporated by reference as if fully set forth herein. In addition, the design data can be standard cell library data, integrated layout data, design data for one or more layers, derivatives of the design data, and full or partial chip design data. Furthermore, the "design," "design data," and "design information" described herein refers to information and data that is generated by semiconductor device designers in a design process and is therefore available for use in the embodiments described herein well in advance of printing of the design on any physical specimens such as reticles and wafers.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein can advantageously be used to improve pattern to design-based alignment when intra-specimen variation and inter-specimen variations are limiting alignment quality and thus inspection sensitivity or other process performance. For example, the embodiments described herein can adapt to intra-specimen and inter-specimen changes by generating alignment parameter(s) (which may include even an patch-to-design alignment (PDA) database) for every die or cluster of dies identified as described further herein.

One embodiment relates to a system configured to determine one or more alignment parameters for use in a process performed on a specimen. One embodiment of such a system is shown in FIG. 1. The system includes one or more computer subsystems (e.g., computer subsystems 36 and 102). In some embodiments, the system also includes one or more components 100 executed by the one or more computer subsystems. The one or more components may include deep generative model 104, which may be configured as described further herein.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

In some embodiments, the system includes an imaging system that includes at least an energy source and a detector. The energy source is configured to generate energy that is directed to a specimen. The detector is configured to detect energy from the specimen and to generate output responsive to the detected energy.

In one embodiment, the imaging system is a light-based imaging system. For example, in the embodiment of the system shown in FIG. 1, imaging system 10 includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to beam splitter 21, which directs the light to specimen 14 at a normal angle of incidence. The angle of incidence may include any suitable angle of incidence, which may vary depending on, for instance, characteristics of the specimen, the defects to be detected on the specimen, the measurements to be performed on the specimen, etc.

The illumination subsystem may be configured to direct the light to the specimen at different angles of incidence at different times. For example, the imaging system may be configured to alter one or more characteristics of one or more elements of the illumination subsystem such that the light can be directed to the specimen at an angle of incidence that is different than that shown in FIG. 1. In one such example, the imaging system may be configured to move light source 16, optical element 18, and lens 20 such that the light is directed to the specimen at a different angle of incidence.

In some instances, the imaging system may be configured to direct light to the specimen at more than one angle of incidence at the same time. For example, the imaging system may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example, in some instances, optical element 18 may be configured as a spectral filter and the properties of the spectral filter can be changed in a variety of different ways (e.g., by swapping out the spectral filter) such that different wavelengths of light can be directed to the specimen at different times. The illumination subsystem may have any other suitable configuration known in the art for directing light having different or the same characteristics to the specimen at different or the same angles of incidence sequentially or simultaneously.

In one embodiment, light source 16 may include a broadband plasma (BBP) light source. In this manner, the light generated by the light source and directed to the specimen may include broadband light. However, the light source may include any other suitable light source such as a laser, which may be any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused to beam splitter 21 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more elements of the illumination subsystem based on the type of illumination to be used for inspection, metrology, etc.

The imaging system may also include a scanning subsystem configured to cause the light to be scanned over the specimen. For example, the imaging system may include stage 22 on which specimen 14 is disposed during inspection, measurement, etc. The scanning subsystem may include any suitable mechanical and/or robotic assembly (that includes stage 22) that can be configured to move the specimen such that the light can be scanned over the specimen. In addition, or alternatively, the imaging system may be configured such that one or more optical elements of the imaging system perform some scanning of the light over the specimen. The light may be scanned over the specimen in any suitable fashion.

The imaging system further includes one or more detection channels. At least one of the one or more detection channels includes a detector configured to detect light from the specimen due to illumination of the specimen by the imaging system and to generate output responsive to the detected light. For example, the imaging system shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the specimen. However, two or more of the detection channels may be configured to detect the same type of light from the specimen (e.g., specularly reflected light). Although FIG. 1 shows an embodiment of the imaging system that includes two detection channels, the imaging system may include a different number of detection channels (e.g., only one detection channel or two or more detection channels). Although each of the collectors are shown in FIG. 1 as single refractive optical elements, each of the collectors may include one or more refractive optical element(s) and/or one or more reflective optical element(s).

The one or more detection channels may include any suitable detectors known in the art. For example, the detectors may include photo-multiplier tubes (PMTs) or any other suitable non-imaging detectors known in the art. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 of the system may be configured to generate images of the specimen from the non-imaging output of the detectors.

It is noted that FIG. 1 is provided herein to generally illustrate a configuration of an imaging system that may be included in the system embodiments described herein. Obviously, the imaging system configuration described herein may be altered to optimize the performance of the system as is normally performed when designing a commercial inspection, metrology, etc. system. In addition, the systems described herein may be implemented using an existing inspection or metrology system (e.g., by adding functionality described herein to an existing inspection or metrology system) such as the 29xx and 39xx series of tools, the SpectraShape family of tools, and the Archer series of tools that are commercially available from KLA Corp., Milpitas, Calif. For some such systems, the embodiments described herein may be provided as optional functionality of the system (e.g., in addition to other functionality of the system). Alternatively, the imaging system described herein may be designed "from scratch" to provide a completely new system.

Computer subsystem 36 of the system may be coupled to the detectors of the imaging system in any suitable manner (e.g., via one or more transmission media, which may include "wired" and/or "wireless" transmission media) such that the computer subsystem can receive the output generated by the detectors during scanning of the specimen. Computer subsystem 36 may be configured to perform a number of functions using the output of the detectors as described herein and any other functions described further herein. This computer subsystem may be further configured as described herein.

This computer subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a standalone or a networked tool.

If the system includes more than one computer subsystem, the different computer subsystems may be coupled to each other such that images, data, information, instructions, etc. can be sent between the computer subsystems as described further herein. For example, computer subsystem 36 may be coupled to computer subsystem(s) 102 (as shown by the dashed line in FIG. 1) by any suitable transmission media, which may include any suitable wired and/or wireless transmission media known in the art. Two or more of such computer subsystems may also be effectively coupled by a shared computer-readable storage medium (not shown).

Although the imaging system is described above as being an optical or light-based subsystem, the imaging system may be an electron beam system. For example, in one embodiment, the imaging system is an electron beam imaging system. In this manner, the energy source may be an electron beam source. In one such embodiment shown in FIG. 2, the imaging system includes electron column 122, which is coupled to computer subsystem 124.

Figure 2:
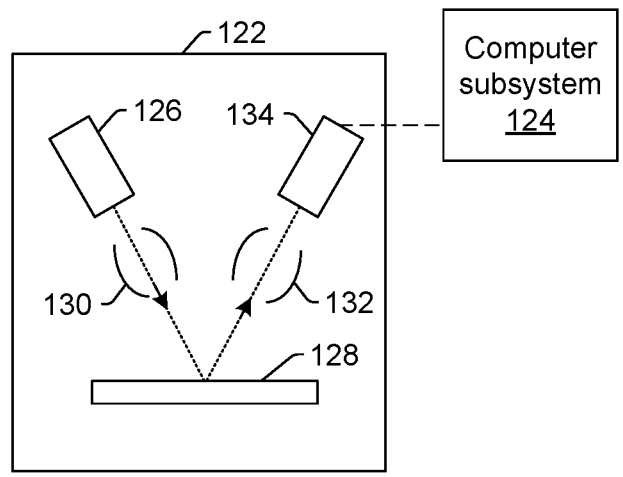

As also shown in FIG. 2, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 2 as being configured such that the electrons are directed to the specimen at an oblique angle of incidence and are scattered from the specimen at another oblique angle, it is to be understood that the electron beam may be directed to and scattered from the specimen at any suitable angles. In addition, the electron beam imaging system may be configured to use multiple modes to generate images of the specimen (e.g., with different illumination angles, collection angles, etc.). The multiple modes of the electron beam imaging system may be different in any image generation parameter(s) of the subsystem.

Computer subsystem 124 may be coupled to detector 134 as described above. The detector may detect electrons returned from the surface of the specimen thereby generating output used by the computer subsystem(s) to form electron beam images of the specimen, which may include any suitable electron beam images. Computer subsystem 124 may be configured to perform any of the functions described herein using the output of the detector and/or the electron beam images. Computer subsystem 124 may be configured to perform any additional step(s) described herein. A system that includes the imaging system shown in FIG. 2 may be further configured as described herein.

It is noted that FIG. 2 is provided herein to generally illustrate a configuration of an electron beam imaging system that may be included in the embodiments described herein. As with the optical system described above, the electron beam system configuration described herein may be altered to optimize the performance of the system as is normally performed when designing a commercial inspection or metrology system. In addition, the systems described herein may be implemented using an existing inspection, metrology, or other system (e.g., by adding functionality described herein to an existing system) such as tools that are commercially available from KLA. For some such systems, the embodiments described herein may be provided as optional functionality of the system (e.g., in addition to other functionality of the system). Alternatively, the system described herein may be designed "from scratch" to provide a completely new system.

Although the imaging system is described above as being a light-based or electron beam system, the imaging system may be an ion beam system. Such an imaging system may be configured as shown in FIG. 2 except that the electron beam source may be replaced with any suitable ion beam source known in the art. In one embodiment, therefore, the energy directed to the specimen includes ions. In addition, the imaging system may be any other suitable ion beam-based imaging system such as those included in commercially available focused ion beam (FIB) systems, helium ion microscopy (HIM) systems, and secondary ion mass spectroscopy (SIMS) systems.

The imaging systems described herein may be configured to generate images for the specimen with multiple modes. In general, a "mode" is defined by the values of parameters of the imaging system used for generating the images of the specimen. Therefore, modes may be different in the values for at least one of the parameters of the imaging system (other than position on the specimen at which the images are generated). For example, in an optical imaging system, different modes may use different wavelength(s) of light for illumination. The modes may be different in the illumination wavelength(s) as described further herein (e.g., by using different light sources, different spectral filters, etc.) for different modes. In another embodiment, different modes may use different illumination channels of the optical imaging system. For example, as noted above, the optical imaging system may include more than one illumination channel. As such, different illumination channels may be used for different modes. The modes may be different in any one or more alterable parameters (e.g., illumination polarization(s), angle(s), wavelength(s), etc., detection polarization(s), angle(s), wavelength(s), etc.) of the imaging system.

In a similar manner, the images generated by the electron beam imaging system may include images generated by the electron beam imaging system with two or more different values of a parameter of the electron beam imaging system. The multiple modes of the electron beam imaging system can be defined by the values of parameters of the electron beam imaging system used for generating images for a specimen. Therefore, modes that are different may be different in the values for at least one of the electron beam parameters of the electron beam imaging system. For example, in one embodiment of an electron beam imaging system, different modes may use different angles of incidence for illumination.

The imaging system embodiments described herein may be configured for inspection, metrology, defect review, or another quality control related process performed on the specimen. For example, the embodiments of the imaging systems described herein and shown in FIGS. 1 and 2 may be modified in one or more parameters to provide different imaging capability depending on the application for which they will be used. In one such example, the imaging system shown in FIG. 1 may be configured to have a higher resolution if it is to be used for defect review or metrology rather than for inspection. In other words, the embodiments of the imaging systems shown in FIGS. 1 and 2 describe some general and various configurations for an imaging system that can be tailored in a number of manners that will be obvious to one skilled in the art to produce imaging systems having different imaging capabilities that are more or less suitable for different applications.

As noted above, the optical, electron, and ion beam imaging systems are configured for scanning energy (e.g., light, electrons, etc.) over a physical version of the specimen thereby generating images for the physical version of the specimen. In this manner, the optical, electron, and ion beam imaging systems may be configured as "actual" imaging systems, rather than "virtual" imaging systems. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

The one or more computer subsystems are configured for determining measures of similarity between images generated by an imaging system for corresponding locations in each of two or more pairs of dies on a specimen. In this manner, a measure of similarity may be determined between all pairs (k-combinations) of die images. A total number of k-combinations may be defined by:

$$\frac{n!}{k!(n-k)!}$$

where n is a total number of the die images, k is 2, and n and k are both integers. For example, if there are 470 dies on a wafer, then there are C(470, 2)=110,215 possible combinations of images to be compared. In this manner, each die on a specimen may be paired with each other die on the specimen, and a similarity measure may be determined for each resulting pair.

However, the embodiments described herein do not necessarily need to determine a similarity measure for every possible die pair on a specimen. For example, a subset of all possible die pairs on a specimen may be selected based on expected variations in the images for different dies on the specimen so that one die is paired with fewer than all of the dies it is expected to be similar to and/or fewer than all of the dies it is expected to be different from. Based on the similarity measures determine for those pairs, the computer subsystem(s) may determine if the die should be paired with additional dies and/or which dies another die on the specimen should be paired with to check for similarities. In another example, all possible die pairs for one die on a specimen may be examined as described herein, and based on which dies that one die is similar to and dissimilar from, other die pairs may be generated and examined. In this manner, although it may be advantageous in some situations to examine every possible die pair on a specimen for their similarities in images, that is not necessary when resources are scarce and smart decisions can be made about expected die image similarities prior to the process or on-the-fly during the process. Although some particularly useful methods for determining the similarity measures are described further herein, other methods may be used to quantify the similarity between variables (e.g., least square fitting), and the embodiments are not limited in the similarity measure calculations that they can perform.

The "corresponding locations" in each of two or more pairs of dies on a specimen may generally be defined as locations having the same die coordinates in each of the two or more pairs of dies. In this manner, images generated for the same areas in the dies may be used for determining similarity measures. The similarity measures may be determined not just for dies on a specimen but may also be determined for other structures (e.g., images of partitioned areas of a photomask). For example, the similarity measures may be determined for dies printed with single die reticles, dies printed with multiple die reticles, reticle fields, or other repetitively patterned areas on the specimen. Therefore, although steps and embodiments may be described herein with respect to dies, the same steps and embodiments may be applied to other repeating patterned areas on the specimen.

Figure 3:
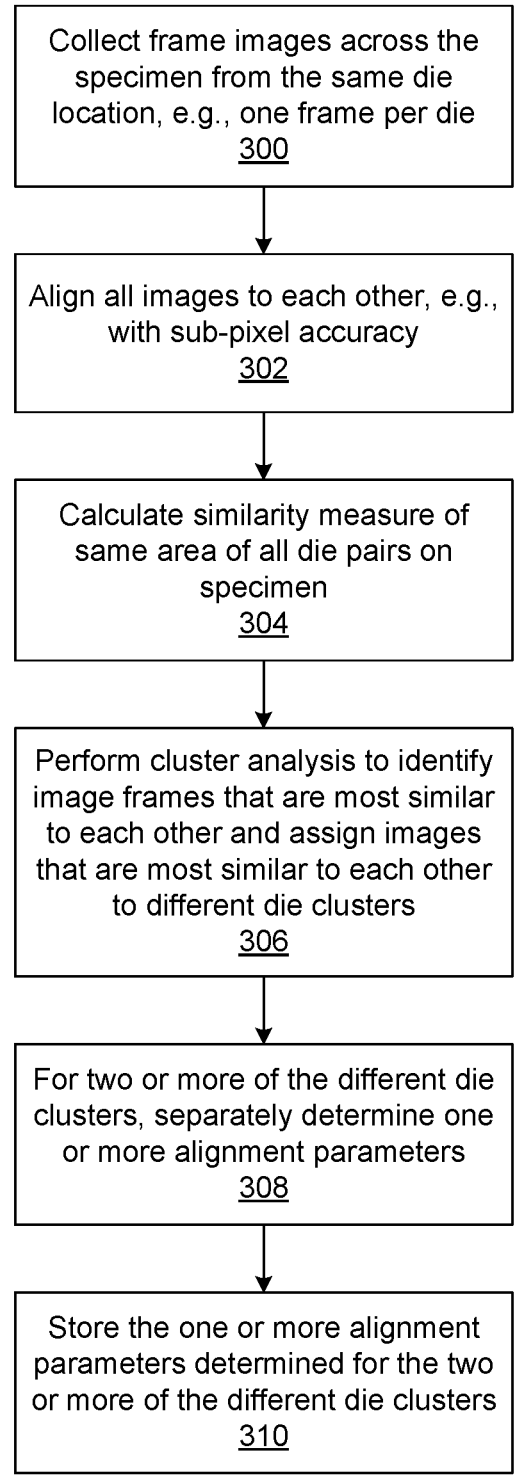
FIGS. 3 and 6-8 are flow charts illustrating embodiments of steps that may be performed by the embodiments described herein.

In another embodiment, the images for which the measures of similarity are determined include one frame image per each of the multiple dies. For example, FIG. 3 shows steps that may be performed in a wafer analysis scan to find similar dies. As shown in step 300 of FIG. 3, the one or more computer subsystems may collect frame images across the specimen from the same die location, e.g., one frame per die. Collecting the frame mages may be performed using an imaging system as described herein.

The image frame that is used for the similarity measures may vary depending on information about the structures in the dies. For example, if alignment targets have already been selected for the specimen process, then the images for which the similarity measures are determined may include images generated at locations of the alignment targets in the dies. If alignment targets have not already been selected for the specimen process, then the image frames that are used in this step may be selected at locations suspected to be suitable for alignment (which may be determined from design data for the specimen), other areas of interest on the specimen such as locations of care areas on the specimen, other areas in the specimen dies where structures are either expected to be robust to changes in the processes performed on the specimen, sensitive to changes in the processes performed on the specimen, or both (where some structures are expected to be process variation robust while other structures are expected to be process variation sensitive), or simply an area chosen arbitrarily.

In one embodiment, the one or more computer subsystems are configured for aligning the images generated by the imaging system for the corresponding locations to each other prior to determining the measures of similarity. For example, as shown in step 302 of FIG. 3, the one or more computer subsystems may align all images to each other, e.g., with sub-pixel accuracy. The image alignment may include coarse alignment that is accurate to within a few pixels (e.g., ≤5 pixels) and fine alignment to within a pixel (e.g., ≤1 pixel) with gain and offset correction. Aligning the images for the corresponding locations to each other may be performed as described further herein or in any other suitable manner known in the art.

In some embodiments, the measures of similarity are determined using a Pearson correlation of gray level intensity. For example, as shown in step 304 of FIG. 3, the one or more computer subsystems may calculate similarity measure of same area of all die pairs on the specimen, which may be performed using a Pearson correlation of gray level intensity. The calculation of the Pearson correlation may be performed for n pixels in the image of die X and n pixels in the image of die Y for each pixel i (e.g., where then pixels from the images of die X are aligned or overlaid with then pixels from the image of die Y). The equation for performing the Pearson correlation is defined as follows:

$$r_{xy} = \frac{\text{cov}(X,Y)}{\sigma_X \sigma_Y} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

where cov(X,Y) is the covariance matrix of pixels in the image of die X and the image of die Y, $\sigma_x$ and $\sigma_y$ are the corresponding standard deviations, $X_i$ and $y_i$ are the respective grayscale values for a pixel i in the image of die X and the image of die Y, and $\bar{x}$ and $\bar{y}$ are the respective grayscale value averages for all of the pixels in the image of die X and the image of die Y. If there are, for example, 128 by 128 pixels in each image, then i ranges from pixel 1 to pixel 16,384. Sub-sections of each image may be processed such that a similarity measure is calculated for each sub-section. The similarity measures for each sub-section may then be combined for a total similarity measure (e.g., 20 sub-sections, each 3 by 42 pixels).

The similarity measure may be determined for a characteristic such as gray level intensity. However, the similarity measure may be determined for any other suitable image characteristic. In addition, although a single similarity measure for a single image characteristic may be sufficient for clustering as described further herein, the embodiments described herein are not limited to a single similarity measure for a single image characteristic. For example, different similarity measures may be determined from different image characteristics, respectively, as described herein, and then the clustering described herein may be performed based on all of the different similarity measures.

A normalized sum squared difference (NSSD) calculation may be used to calculate the similarity measure. The calculation of the NSSD may be performed for M*N pixels in the image of die X and M*N pixels in the image of die Y (e.g., where the pixels from the image of die X are aligned or overlaid with the pixels from the image of die Y). The equation for performing the NSSD calculation is defined as follows:

$$NSSD = \frac{1}{MN}\sum_{i=1}^{M}\sum_{j=1}^{N}[X(i,j) - yY(i,j) - K]^2$$

where M and N are the respective numbers of pixels in each row and each column of the images, i is the pixel index for each row, j is the pixel index for each column, X(i,j) is the image of die X(e.g., a matrix of grayscale values), Y(i,j) is the image of die Y (e.g., a matrix of grayscale values), y is the gain between the image of die X and the image of die Y, and K is the offset between the image of die X and the image of die Y.

The one or more computer subsystems are configured for performing cluster analysis based on the determined measures of similarity to identify the images that are most similar to each other and to assign different subsets of the images that are most similar to each other to different die clusters, respectively. In this manner, cluster analysis may be performed to partition the pairs of die images into clusters (i.e., groups) where the pairs within each cluster have a substantially similar similarity measure. The clustering itself may identify the images that are most similar to each other, and which of the different subsets of the images that are assigned to each of the different die clusters, respectively, may vary depending on the parameters used for the clustering analysis such as thresholds. Therefore, how similar two images have to be so as to be considered having a "substantially similar similarity measure" may be defined by the cluster analysis parameters.

As shown in step 306 of FIG. 3, the one or more computer subsystems may perform cluster analysis to identify image frames that are most similar to each other and assign images that are most similar to each other to different die clusters. The embodiments described herein therefore use a clustering-based approach that uses a wafer analysis scan to identify "matching" dies, i.e., dies for which images generated by the imaging system are substantially similar, for which the same alignment parameter(s) such as the same alignment database can be used.

In one embodiment, the cluster analysis includes an unsupervised learning technique. For example, the approach described and shown in FIG. 3 is an unsupervised learning approach to find clusters of dies for which images generated by the imaging system are substantially similar. In this manner, the embodiments described herein may be configured for optical (or other) image to IC-design alignment by using unsupervised learning and adaptive database generation methods. One new feature of the embodiments described herein is therefore that the computer subsystem(s) may use unsupervised learning to find clusters of dies that can use the same PDA database and other alignment parameter(s) for alignment.

In some embodiments, identifying the images that are most similar to each other includes determining dissimilarity scores based on the measures of similarity, and assigning the different subsets of the images to the different die clusters includes generating a hierarchical clustering dendogram based on the dissimilarity scores and a threshold applied to the dissimilarity scores. For example, the one or more computer subsystems may perform cluster analysis by using dissimilarity scores and a hierarchical clustering dendogram with one of the thresholds described herein.

Figure 4:
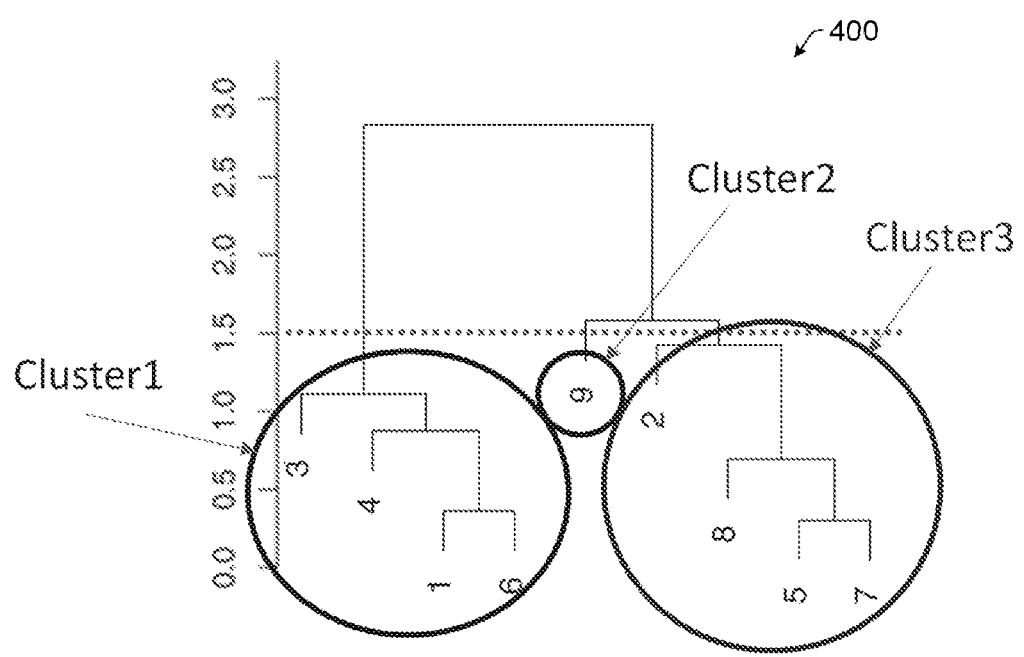
FIG. 4 is a schematic diagram illustrating an example of a hierarchical clustering dendogram that may be generated by the embodiments described herein.

FIG. 4 illustrates one example of a hierarchical clustering dendogram that may be generated by the one or more computer subsystems described herein. The dendogram plots dissimilarity value on the vertical axis and location for each die on the specimen on the horizontal axis. As shown in hierarchical clustering dendogram 400, the hierarchical clustering has identified 3 clusters in this example, Cluster1, Cluster2, and Cluster3. The dendogram may however be partitioned into any number of clusters (e.g., two or more clusters), and the number of clusters shown in FIG. 4 are only one example.

Figure 5:
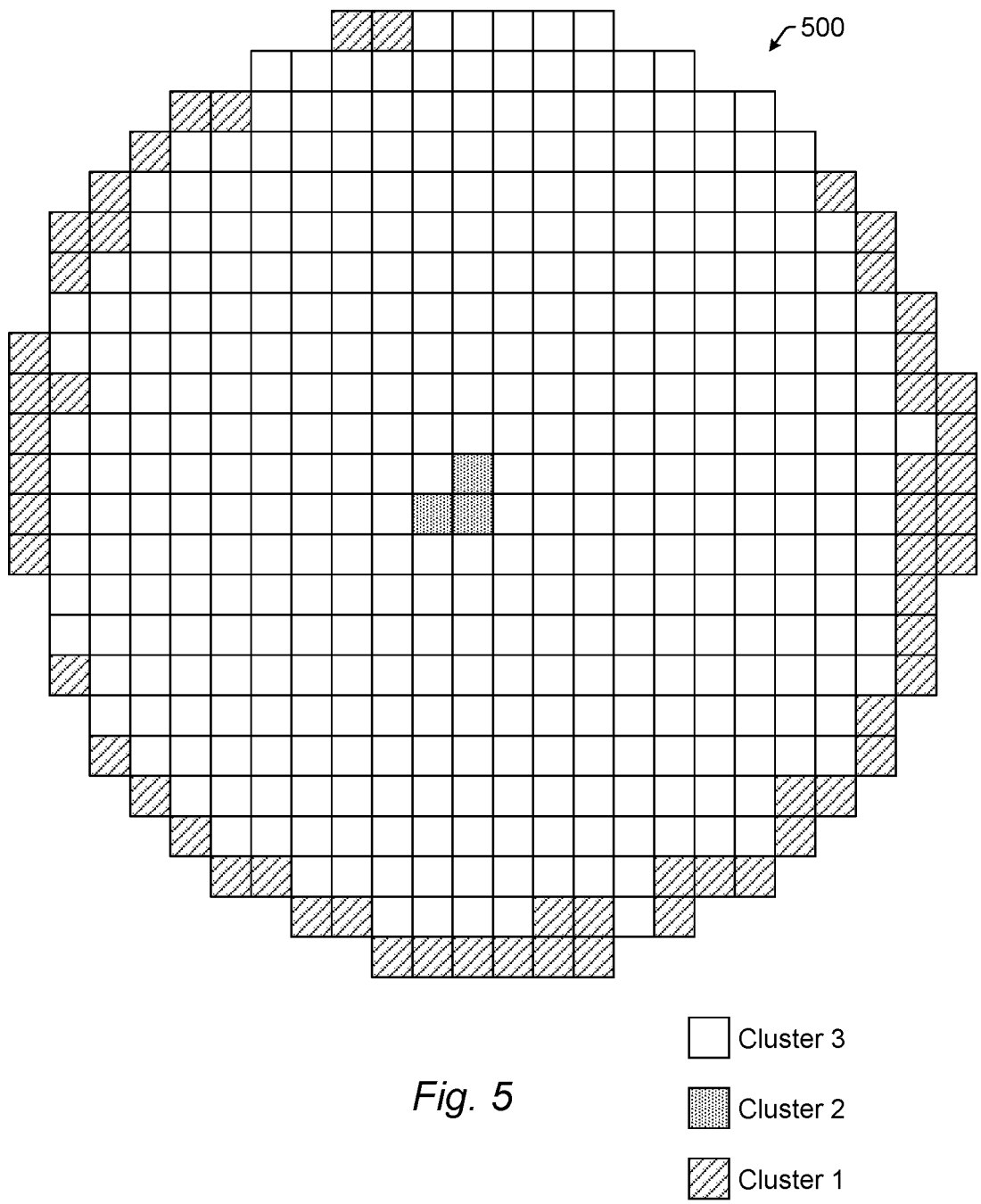
FIG. 5 is a schematic diagram illustrating a plan view of one example of dies on a wafer and the different die clusters they are assigned to based on the hierarchical clustering dendogram shown in FIG. 5.

The results of the clustering may be used to generate a wafer or specimen map that shows us where the die images are most similar. FIG. 5 shows how the die clusters can be mapped to the dies on the specimen. For example, a specimen map can be constructed where each of the entries in the dendogram corresponds to a certain die location on the specimen. The groupings shown in the wafer map of FIG. 5 may be constructed by applying hierarchical clustering with average linkage to the dendogram of FIG. 4. Wafer map 500 shows each die on the wafer as a square with a pattern fill depending on which cluster it belongs to as shown in the map key shown in FIG. 5. As can be seen in FIG. 5, the dies in Cluster 1 are generally located at or near the edge of the wafer, while dies in Cluster 2 are generally located at or near the center of the wafer. The remainder of the dies on the wafer are dies assigned to Cluster 2. Such clustering of dies on specimens such as wafers may occur due to typical process variations that occur on such specimens (e.g., where the process conditions near the edge of the wafer differ from the process conditions away from the edge of the wafer and where the process conditions near the center of the wafer different from the process conditions spaced from the center of the wafer), which can cause variations in the images of the wafer. Therefore, although FIG. 5 shows one example of where different die clusters may generally be on a specimen such as a wafer, this example is by no means limiting and will vary depending on the images and their similarities to one another.

In one such embodiment, the threshold is a user-defined threshold. In another embodiment, the threshold is a cluster count threshold. In this manner, the threshold that is applied to the dissimilarity scores to generate the hierarchical clustering dendogram may be a user-designed dissimilarity score threshold or a cluster count threshold (i.e., an upper limit and/or lower limit on how many images can be assigned to a single cluster). The clusters may be partitioned based on a user or pre-defined partitioning setting or algorithmically. In the dendogram of FIG. 4, all of the leaves have a dissimilarity value below a threshold dissimilarity value of 1.5. The threshold dissimilarity value may be preselected, user-selected based on the data, or algorithmically determined.

All pairwise inter-cluster dissimilarities among the clusters may be examined, and the pair(s) of clusters that are least dissimilar may be identified and fused. The dissimilarity between these two clusters indicates the height in the dendogram at which the fusion may be placed. In some embodiments, the cluster analysis includes hierarchical clustering, and the hierarchical clustering includes average linkage, single linkage, complete linkage, or centroid linkage. For example, the unsupervised learning approaches used for the clustering can include hierarchical clustering with complete, single, average, or centroid linkage. In order to calculate the dissimilarity between groups of clusters, the concept of linkage may be employed. The possible linkages include complete linkage, single linkage, average linkage, and centroid linkage, which respectively represent maximal, minimal, mean, and centroid inter-cluster dissimilarities. Hierarchical clustering takes n observations as input and calculates $$\binom{n}{2}$$

pairwise dissimilarities of all possible combinations of such observations. Each observation may consist of the gray level values of an image sized x by y pixels. When there are n dies on the specimen, the Pearson correlation for all $$\binom{n}{2}$$

combinations may be determined as described above.

In a further embodiment, the cluster analysis includes k-means clustering. For example, the unsupervised learning approaches used for the clustering can include k-means based clustering algorithms (where k is the number of clusters which is not limited to any particular value) such as the traditional k-means or KMeans++. k-means tries to isolate clusters based on their centroid locations taking a user-defined number of clusters as an input. k-means clustering can be performed in any suitable manner known in the art.

On the other hand, hierarchical clustering takes n observations as an input and calculates C(n,2) pairwise dissimilarity values of all possible combinations of such observations. The C(n,2) correlation coefficients are summarized in a correlation matrix from which the correlation distance (i.e., dissimilarity) matrix ($1-r_{xy}$) is derived. In one example, each observation includes the grayscale level values of an image having a size of 512 by 512 pixels.

For two or more of the different die clusters, the one or more computer subsystems are configured for separately determining one or more alignment parameters used for aligning images generated by the imaging system for the specimen or another specimen to a common reference. The common reference may simply be a predetermined alignment target in the dies, which may be selected in any suitable manner known in the art. In other words, aligning runtime images for the predetermined alignment target to each other (or to an image for the predetermined alignment target generated during setup) can be used to determine an offset between the dies that can then be used to align the entire die images to each other. Such alignment may be performed as described further herein. Such a common reference may be used when the die images are just being aligned to each other. However, the common reference may be a design for the specimen, and alignment of the runtime die images to the design may be achieved via alignment of setup images to design and then runtime images to the setup images thereby aligning runtime images to design, which may also be performed as described herein.

Regardless of how the alignment to the common reference is performed, for each (or at least two) of the different die clusters, the one or more computer subsystems determine separately one or more alignment parameters used for the aligning. In this manner, the computer subsystem(s) may determine first alignment parameter(s) for a first die cluster, second alignment parameter(s) for a second die cluster, and so on. Any one or more of the first alignment parameters may be different from any one or more of the second alignment parameters, and so on. For example, as shown in step 308 of FIG. 3, for two or more of the different die clusters, the one or more computer subsystems may separately determine one or more alignment parameters. The one or more alignment parameters that are determined by the embodiments described herein may include any one or more of the alignment parameters described further herein and any other adjustable alignment parameters known in the art.

The steps described herein may be performed for one specimen (i.e., a setup specimen) and then the alignment parameter(s) that are determined may be used for one or more other specimens (i.e., runtime specimen(s)) on which the same process(es) have been performed as the one specimen (i.e., specimens of the same layer). Using alignment parameter(s) for runtime specimens that were generated using a setup specimen may be suitable when the process(es) that are performed on the setup and runtime specimens are not expected to change much in a relatively short amount of time and tend to produce specimens having the same or substantially similar intra-specimen variations.

When that is not the case and/or when not much is known about the process(es) performed on the setup and runtime specimens, the steps described herein may be performed for each specimen for which the alignment will be performed. In this manner, prior to performing the process that includes the alignment, each specimen may be used as its own setup specimen (i.e., each specimen may be used to determine the one or more alignment parameters as described herein, which may then be used for image alignment for that specimen and that specimen only). In such embodiments, a specimen setup scan may be performed before the specimen runtime scan. The results of the specimen setup scan may then be used to determine the one or more alignment parameters that are then used for the runtime scan. In such embodiments, measures described herein to speed up the process may become particularly advantageous (e.g., starting with comparisons of fewer than all of the possible die pairs and possibly dynamically selecting die pairs for analysis based on the preliminary comparison results).

One new feature of the embodiments described herein is therefore that they create PDA methods that adapt to intra-specimen and inter-specimen variations. One significant improvement that the embodiments provide over other currently used methods and systems for image alignment is therefore that they provide highly accurate alignment even for specimens that deviate strongly from the setup specimen or show relatively high within-specimen variation.

In one embodiment, separately determining the one or more alignment parameters includes separately generating alignment target images for each of the two or more of the different die clusters. The one or more alignment parameters that are determined for each of the two or more different die clusters may include a PDA reference database for each dissimilar site (die), i.e., the image used for aligning, and/or any other parameters (e.g., for rendering an image used for alignment). In one such example, when there are three different clusters generated by the cluster analysis as shown in FIGS. 4 and 5, the one or more computer subsystems may generate one PDA database per cluster. In other words, the results of the hierarchical clustering may cause the one or more computer subsystems to decide on creating three different databases for PDA.

Figure 6:
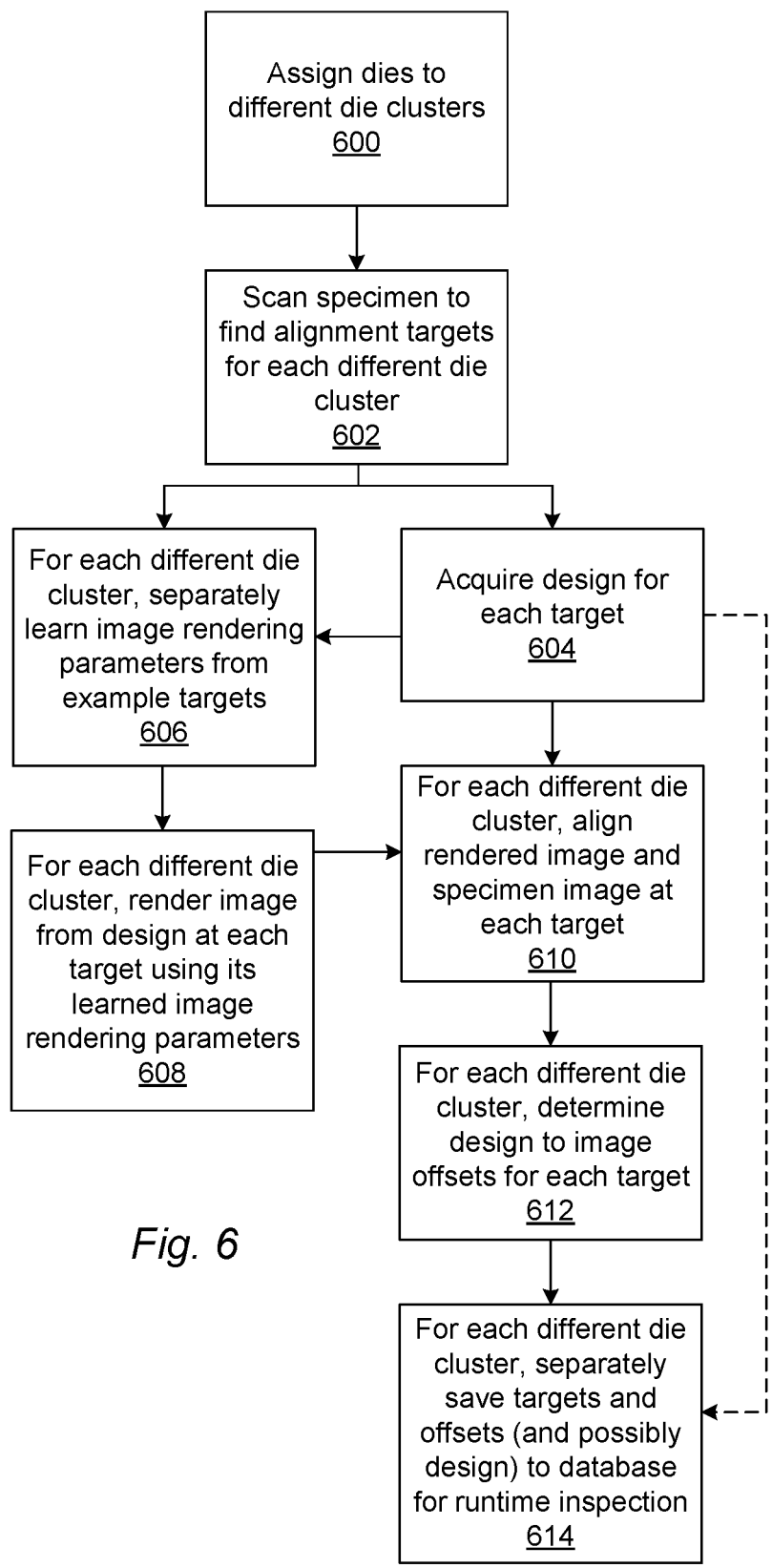

FIG. 6 illustrates one embodiment of steps that may be performed by the one or more computer subsystems to generate different alignment parameters such as different alignment target images for different die clusters. In this manner, the steps shown in FIG. 6 may be performed during setup of an alignment process that will be performed during a process performed on a specimen. As shown in step 600 of FIG. 6, the one or more computer subsystems may assign dies on the specimen to their different die clusters, which may be performed as described further herein.

The one or more computer subsystems may then use the imaging system in step 602 to scan the specimen to find alignment targets for each different die cluster. In this manner, the computer subsystem(s) may be configured for selecting the alignment target(s) from setup images of the specimen generated with the imaging system. The computer subsystem(s) may select alignment target(s) for use in training and runtime. The alignment target(s) selected for training and runtime may or may not be the same. For example, training and runtime may be performed using the same alignment target, but with fewer instances of the alignment target for training versus runtime. The opposite is also possible. The alignment target(s) selected by the computer subsystem(s) may also include different alignment targets having different characteristics other than just different positions on the specimen or in the design. The alignment target(s) may be selected as described further herein or in any other suitable manner known in the art.

Examples of design-based alignment are described in U.S. Pat. No. 9,830,421 to Bhattacharyya et al. issued Nov. 28, 2017, U.S. Pat. No. 10,620,135 to Brauer issued Apr. 14, 2020, and U.S. Pat. No. 10,698,325 to Brauer issued Jun. 30, 2020, which are incorporated by reference as if fully set forth herein. The embodiments described herein may be configured to select alignment targets as described in these patents and may be further configured as described in these patents.

In step 602 of FIG. 6, for each of the different die clusters, the computer subsystem(s) may scan an entire die to find 2D unique targets that evenly distribute across the die. Scanning an entire die on a specimen or another suitable area on a specimen may be performed as described further herein. The unique targets may be unique in any suitable manner known in the art that renders the targets suitable for alignment purposes. The 2D unique targets may be found in any suitable manner (e.g., by searching within a predetermined image window for patterns that are unlike any others in the window). For example, the unique targets may be a pattern that has a unique shape compared to other patterns within a predetermined search window such as an image frame or job, patterns that have a unique spatial relationship with respect to each other within the predetermined search window, etc.

The alignment targets are preferably 2D in that they can be used to perform alignment in both the x and y directions, although that is not necessary. For example, the alignment targets may be selected so that one or more are useful for alignment in only the x direction and one or more others are useful for alignment in only the y direction.

In addition, although it may be preferable to find and use alignment targets that are evenly distributed across a die or other area on the specimen, that is also not necessary. In other words, although alignment targets may be selected as shown in step 602 of FIG. 6, the embodiments described herein may be used with any suitable alignment targets known in the art that are selected in any suitable manner known in the art. Although it may be practical to select multiple unique targets for use in the embodiments described herein, in general, any one or more unique targets may be selected for each of the different die clusters. Each of the unique targets may be different from each other in any unique way. In addition, the unique targets may include more than one instance of the same unique target.

As shown in step 604 of FIG. 6, the one or more computer subsystems may acquire the design for each of the unique target(s) found in the specimen images. The one or more computer subsystems may acquire the design in any suitable manner such as by searching a design for the specimen based on information for the unique target(s) determined from the images generated by the scanning, by requesting a portion of a design (e.g., a design clip) at the position(s) of the unique target(s) from a storage medium or computer system that contains the design, etc. The design that is received by the one or more computer subsystems may include any of the design, design data, or design information described further herein.

The alignment target images generated in step 602 and the design data for the alignment targets acquired in step 604 may be used by the one or more computer subsystems for generating a training set that is used to learn the image rendering parameters for each different die cluster. For example, in the case of a deep generative model, the computer subsystem(s) may be configured for generating a training set, which includes training images of the specimen generated with the imaging system and corresponding design data for the specimen, and training the deep generative model with the training set. (Although some of the embodiments are described herein with respect to a deep generative model, the embodiments may use any suitable model such as physics-based forward models that model the imaging system optics and any other components involved in the image generation to generate rendered images for use in the embodiments described herein).

Generating a training set may include storing the training images and corresponding design data in any suitable manner and with any suitable format such that the training set can be used for training a deep generative model. The computer subsystem(s) may store information for the training set in any of the computer readable storage media described herein. The training set may be used by the computer subsystem(s) in any suitable manner known in the art including being split into subsets for training and verification, being updated, modified, or replaced over time or when the process changes, etc.

In some embodiments, separately determining the one or more alignment parameters includes separately determining one or more parameters for transforming first actual information for an alignment target on the specimen from a first type of information to a second type of information by inputting the first actual information into a deep generative model. For example, as shown in step 606 of FIG. 6, the one or more computer subsystems may, for each different die cluster, separately learn image rendering parameters from example targets. The computer subsystem(s) may therefore generate one model for each different die cluster (or at least different parameters for the same model). In this manner, for each (or at least two) of the different die clusters, the one or more computer subsystems may separately train a model such as a deep generative model for transforming design data to simulated specimen images or for transforming specimen images into simulated design data.

The one or more computer subsystems may be configured for transforming first actual information for an alignment target on a specimen from a first type of information to a second type of information by inputting the first actual information into the deep generative model. The one or more computer subsystems may input the first actual information into the deep generative model in any suitable manner. "Actual information" as that term is used herein refers to information that has not been simulated by a model including those described herein but instead is acquired from a source other than the models described herein. The possible sources of the actual information in the embodiments described herein include a design database, file, storage medium, etc. or a specimen imaging tool such as those described herein.

In one such embodiment, when the first type of information is design data, then the second type of information is design data. In another such embodiment, when the first type of information is a specimen image, then the second type of information is design data. The terms "first" and "second" as used herein are not intended to have any connotation other than to indicate different things. The first and second types of information are different types of information, where in general either the first or second type of information is design data and the other of the first and second types of information is specimen images. In this manner, different types of information as that term is used herein is not intended to mean the same type of information with different characteristics. For example, the different types of information as that term is used herein is not intended to mean the same type of specimen images (e.g., optical images) with different resolutions or other different image characteristics. Instead, the different types of information described herein are in different domains such as design data space vs. specimen image space.

The deep generative model in some cases may be configured as a generative adversarial network (GAN) that includes a generator and discriminator. When the first type of information is design data, and the second type of information is specimen images, the generator is trained to produce specimen images that cannot be distinguished from real specimen images. When the first type of information is specimen images and the second type of information is design data, the generator is trained to produce design clips that cannot be distinguished from real design clips. In either case, the adversarially trained discriminator is trained to classify between fakes and real tuples during training.

A "generative" model can be generally defined as a model that is probabilistic in nature. In other words, a "generative" model is not one that performs forward simulation or rule-based approaches and, as such, a model of the physics of the processes involved in generating an actual image is not necessary. Instead, the generative model can be learned (in that its parameters can be learned) based on a suitable training set of data.

The deep generative model may be a GAN, a conditional generative adversarial network (cGAN), or any other suitable type of GAN known in the art. Additional description of the general architecture and configuration of GANs and cGANs can be found in U.S. patent application Ser. No. 17/170,688 by Brauer filed Jan. 8, 2021 and Ser. No. 17/308,878 by Brauer et al. filed May 5, 2021 and in "Generative Adversarial Nets" Goodfellow et al., arXiv: 1406.2661, Jun. 10, 2014, 9 pages, "Semi-supervised Learning with Deep Generative Models," Kingma et al., NIPS 2014, Oct. 31, 2014, pp. 1-9, "Conditional Generative Adversarial Nets," Mirza et al., arXiv:1411.1784, Nov. 6, 2014, 7 pages, "Adversarial Autoencoders," Makhzani et al., arXiv:1511.05644v2, May 25, 2016, 16 pages, and "Image-to-Image Translation with Conditional Adversarial Networks," by Isola et al., arXiv:1611.07004v2, Nov. 22, 2017, 17 pages, which are incorporated by reference as if fully set forth herein. The embodiments described herein may be further configured as described in these references.

In step 606, therefore, a deep generative model may be trained based on a training set that includes specimen patch images with corresponding design clips. Whether the specimen images are the training inputs and the corresponding design clips are the training outputs or vice versa will depend on how the deep generative model will transform the first actual information and the types of information that the first actual information and the second actual information are. The training may include inputting the training inputs into the deep generative model and altering one or more parameters of the deep generative model until the output produced by the deep generative model matches (or substantially matches) the training outputs. Training may include altering any one or more trainable parameters of the deep generative model. For example, the one or more parameters of the deep generative model that are trained by the embodiments described herein may include one or more weights for any layer of the deep generative model that has trainable weights. In one such example, the weights may include weights for convolution layers but not pooling layers.

Although some embodiments are described herein with respect to a model (e.g., a deep generative model), the embodiments described herein may include or use multiple models (e.g., multiple deep generative models) for any one die cluster. In one such example, different deep generative models may be trained and used as described herein for different modes, respectively, of the imaging system. For example, alignment performed for one mode may not necessarily be transferrable to another mode. In other words, by performing alignment for one mode, not all of the modes may be aligned to design (or at least not aligned to design with sufficient accuracy). In most cases, different modes of an inspection or other imaging tool will produce images and/or output that are different from each other in one of several possible ways, e.g., noise levels, contrast, resolution, image type (e.g., DF vs. BF, optical vs. electron beam, etc.), and the like. Therefore, if a deep generative model is trained for one mode of a tool, chances are it will be unsuitably trained to transform information for another mode of the tool. As such, for each (or at least one) of the die clusters, multiple deep generative models may be separately and independently trained, one for each mode of interest, and image-to-design alignment may be separately and independently performed for different modes used in a single process performed on a specimen. In this manner, when different modes are used to generate images for a specimen, the images generated in more than one mode may be aligned to the design for the specimen. The same pre-trained deep generative network may be used for each mode although that is not necessary. Each trained deep generative model may then be used to perform mode specific transformations.

When the first actual information is design data, the first actual information input to each differently trained deep generative model may be the same design clips or different portions of the same design since the design of the specimen will not change from mode to mode. When the first actual information is specimen images, then the input to each differently trained deep generative model will be different.

As shown in step 608 of FIG. 6, for each different die cluster, the one or more computer subsystems may render an image from design at each target using its learned image rendering parameters. In other words, the one or more computer subsystems may input the design for each target into the trained model produced by step 606 of FIG. 6 to generate simulated specimen images for each target selected. This step may be separately performed for each different die cluster using its model with the image rendering parameter(s) learned for it. Step 608 in FIG. 6 shows the case in which simulated specimen images are generated from design, but this step may include the reverse (not shown) in which simulated design data is generated from actual specimen images, which may be performed for each selected target for each different die cluster.

As shown in step 610 of FIG. 6, for each different die cluster, the one or more computer subsystems may align the rendered image and specimen image at each target. Step 610 of FIG. 6, therefore, shows the case in which the model generates simulated specimen images that are then aligned to actual specimen images. However, this step may include the reverse situation in which the model generates simulated design data that is then aligned to the actual design data for the targets.

Aligning the rendered image and the specimen image (or the rendered design data and the actual design data) may be performed based on a NSSD. For example, step 610 of FIG. 6 may be performed using NSSD of the transformed information and the actual information to calculate alignment offset. NSSD may be performed using any suitable method, algorithm, function, etc. known in the art. These aligning steps may however be performed using any other suitable alignment method or algorithm known in the art.

In another embodiment, separately determining the one or more alignment parameters includes separately determining align-to-design offsets for each of the two or more of the different die clusters. For example, as shown in step 612 of FIG. 6, for each different die cluster, the one or more computer subsystems may determine a design-to-image offset for each target, which may be performed based on results of the aligning generated for the die cluster whose offset is being determined. This offset may be determined in any suitable manner and may be expressed in any suitable manner (e.g., as a Cartesian offset, as a two-dimensional function, etc.). This offset may also be determined for each inspection frame or other job that will be processed in the process for which the alignment parameter(s) are being determined.

The computer subsystem(s) are also configured for storing the one or more alignment parameters determined for the two or more of the different die clusters for use in a process performed on the specimen or the other specimen with the imaging system. For example, as shown in step 310 of FIG. 3, the one or more computer subsystems may be configured for storing the one or more alignment parameters determined for the two or more of the different die clusters. In addition, as shown in step 614 of FIG. 6, for each different die cluster, the one or more computer subsystems may separately save targets and offsets (and possibly design) to a database for runtime inspection. In this manner, any parameter(s) for alignment that are determined for each target and each different die cluster may be stored in steps 310 and 614. For example, the one or more computer subsystems may create new independent PDA databases for each cluster of dies which is different from others according to an initial specimen analysis scan and then store each of those PDA databases for use in the process. One new feature of the embodiments described herein is therefore that they may generate more than one PDA database for a single process.

The computer subsystem(s) may store the one or more alignment parameters in any suitable computer-readable storage medium. The one or more alignment parameters may be stored with any of the results described herein and may be stored in any manner known in the art. The storage medium may include any storage medium described herein or any other suitable storage medium known in the art. After the one or more alignment parameters have been stored, the one or more alignment parameters can be accessed in the storage medium and used by any of the method or system embodiments described herein, formatted for display to a user, used by another software module, method, or system, etc.

In one embodiment, storing the one or more alignment parameters includes storing the one or more alignment parameters for use in the process performed on the specimen and the process performed on at least one other specimen of the same type as the specimen. For example, the embodiments described herein may set up alignment of a specimen for a process recipe, which may be performed as part of setting up, creating, calibrating, or updating the recipe. That recipe may then be stored and used by the embodiments described herein (and/or another system or method) to perform the process on the specimen and/or other specimens to thereby generate information (e.g., defect information) for the specimen and/or other specimens. In this manner, the one or more alignment parameters may be generated and stored once per specimen layer, and the one or more alignment parameters may be used for the process performed on multiple specimens of the same layer.

Of course, as in any process, if the process performed on the specimen layer is updated, calibrated, modified, retrained, etc., the one or more alignment parameters may also be updated, calibrated, modified, retrained, etc. in the same manner as any other process parameter. Updating, calibrating, modifying, retraining, etc. the one or more alignment parameters may be performed in the same manner described herein for determining one or more alignment parameters for use in a process performed on a specimen. In this manner, the embodiments described herein may be configured for repeating the steps described herein at various times to modify a previously setup process.

In one embodiment, the process is an inspection process. However, the process may include any of those described herein such as inspection, defect review, metrology, and the like. Such processes may include any suitable such processes known in the art.

As described herein, therefore, the embodiments can be used to setup a new process or recipe. The embodiments may also be used to modify an existing process or recipe, whether that is a process or recipe that was used for the specimen or was created for one specimen and is being adapted for another specimen. In addition, the embodiments described herein are not limited to inspection process creation or modification. For example, the embodiments described herein can also be used to setup or modify a process for metrology, defect review, etc. in a similar manner. In particular, determining one or more alignment parameters for use in a process and performing alignment as described herein can be performed regardless of the process that is being setup or revised. The embodiments described herein can therefore be used not just for setting up or modifying an inspection process but can be used for setting up or modifying any quality control type process performed on the specimens described herein.

In one embodiment, the one or more computer subsystems are configured for determining different subsets of the dies corresponding to the different subsets of the images assigned to the different die clusters, respectively, assigning the different subsets of the dies to the different die clusters, respectively, and storing information for locations of the different subsets of the dies on the specimen and the different die clusters to which the different subsets of the dies have been assigned for use in the process. For example, once the images have been assigned to the different die clusters, the dies in which the images have been generated can be assigned to the different die clusters based on information about where the images were generated on the specimen. Therefore, rather than just images, entire dies can be assigned to the different die clusters. As described herein, different die clusters may be assigned a name such as Cluster1, Cluster2, etc., but any suitable naming convention may be used for the die clusters and assigned to the different images and the different dies so that the die cluster that an image or die belongs to can be determined based on the assigned names. The information for the locations of the different subsets of the dies on the specimen may be stored in any suitable manner including those described further herein. In this manner, when a die is being examined in the process performed on the specimen, its die cluster can be identified from the stored information and then the alignment parameter(s) determined for that die cluster may be used for image alignment performed for that die.

In another such embodiment, the process includes assigning test dies on the specimen or the other specimen to the different die clusters by comparing locations of the test dies on the specimen or the other specimen to the locations of the different subsets of the dies, assigning the one or more alignment parameters to the test dies based on the different die clusters to which the test dies are assigned, and performing the aligning the images generated for the specimen or the other specimen to the common reference using the one or more alignment parameters assigned to the test dies in which the images were generated in the process. In other words, assigning a test die on a specimen on which the process is being performed to a cluster may include determining its location on the specimen, determining the die cluster of the die at the same location on the setup specimen, and then assigning that die cluster to the test die. Determining and comparing the locations of the test dies to the locations of the subsets of dies assigned to the different die clusters may be performed in any suitable manner using the stored information for locations of the different subsets of the dies on the specimen and the different die clusters to which the different subsets of the dies have been assigned for use in the process. The alignment parameter(s) determined for the die cluster to which a test die has been assigned can then be used to perform alignment for that test die.

Figure 7:
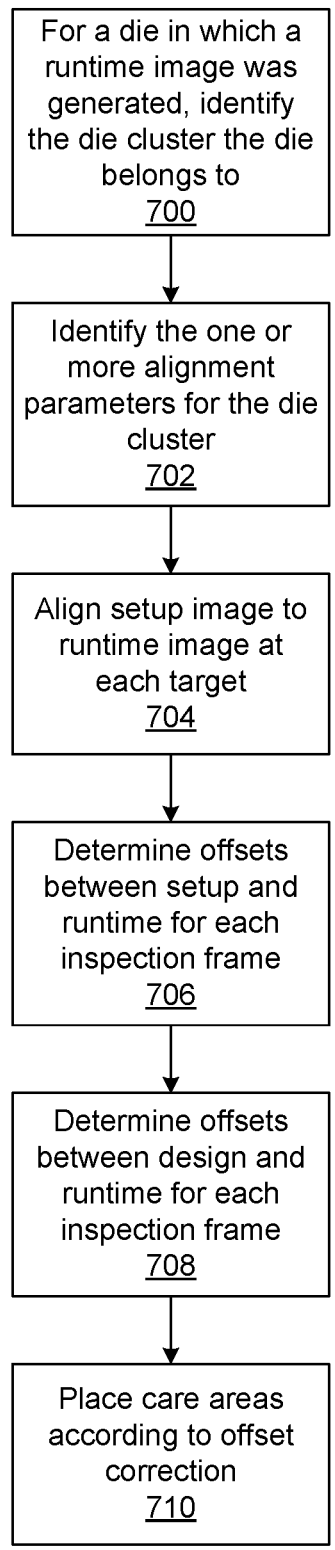

In one such example, FIG. 7 illustrates steps that may be performed by the one or more computer subsystems during runtime of a process performed on a specimen. As shown in step 700, for a die in which a runtime image was generated, the one or more computer subsystems may identify the die cluster the die belongs to, which may be performed as described herein. As shown in step 702, the one or more computer subsystems may then identify the one or more alignment parameters for the die cluster, which may also be performed as described herein. In this manner, the one or more computer subsystems may select the correct PDA database (and any other alignment parameter(s)) according to the wafer analysis scan. As such, the embodiments described herein may use the best matching PDA database from among the multiple PDA databases generated for the process for use for alignment. The remaining steps shown in FIG. 7 may be performed using the alignment parameter(s) identified for the die cluster to which a die, in which a runtime image was generated, was assigned.

In one such embodiment, the one or more computer subsystems are configured to perform the process on the specimen with the imaging system, and the process includes aligning a runtime alignment target image generated for the specimen in the process to the setup alignment target image, determining a runtime-to-setup offset based on results of aligning the runtime alignment target image to the setup alignment target image, and determining a runtime-to-design offset based on the runtime-to-setup offset and the align-to-design offset. For example, as shown in step 704 of FIG. 7, during the process, the one or more computer subsystems may align a setup image to a runtime image at each target. The setup image may be the rendered specimen image and the runtime image may be the actual specimen image. This step may, however, include the reverse in which during the process, the one or more computer subsystems may align a setup design clip to a runtime design clip at each target. In this embodiment, therefore, the setup image is the actual design data, and the runtime image is the rendered design data generated from runtime specimen images. Regardless of the images that are being aligned, the alignment in step 704 may be performed using any of the alignment techniques described herein. As further shown in step 706 of FIG. 7, the one or more computer subsystems may determine offsets between setup and runtime for each inspection frame. In addition, as shown in step 708 of FIG. 7, the one or more computer subsystems may determine offsets between design and runtime for each inspection frame. All of these steps may be performed as described further herein.

Determining a runtime-to-design offset based on the runtime-to-setup offset and the align-to-design offset may include modifying the align-to-design offset by or with the runtime-to-setup offset in any suitable manner. This step may be performed to correct the align-to-design offset for any differences in the alignment of the setup specimen and the runtime specimen to the imaging system and any other differences between the setup specimen and the runtime specimen such as placement differences in the alignment targets on different specimens.

In another such embodiment, the process also includes determining care areas in the images generated by the imaging system during the process performed on the specimen or the other specimen based on the runtime-to-design offset. For example, as shown in step 710 of FIG. 7, the one or more computer subsystems may place care areas according to offset correction. "Care areas" as they are commonly referred to in the art are areas on a specimen that are of interest for inspection purposes. Sometimes, care areas are used to differentiate between areas on the specimen that are inspected from areas on the specimen that are not inspected in an inspection process. In addition, care areas are sometimes used to differentiate between areas on the specimen that are to be inspected with one or more different parameters. For example, if a first area of a specimen is more critical than a second area on the specimen, the first area may be inspected with a higher sensitivity than the second area so that defects are detected in the first area with a higher sensitivity. Other parameters of an inspection process can be altered from care area to care area in a similar manner.

In these embodiments, the one or more computer subsystems may use 0 care area border in x and y directions. For example, because the embodiments described herein can align specimen images to design with substantially high accuracy, the care areas can be located in the specimen images with substantially high accuracy. Therefore, a border, which is commonly used to increase a care area artificially to account for any errors in care area placement, can be effectively eliminated by the embodiments described herein. Placing the care areas with such high accuracy and eliminating the care area border is advantageous for a number of reasons including that the detection of nuisance on the specimen can be significantly reduced and the detection of defects of interest (DOIs) on the specimen can be improved.

Figure 8:
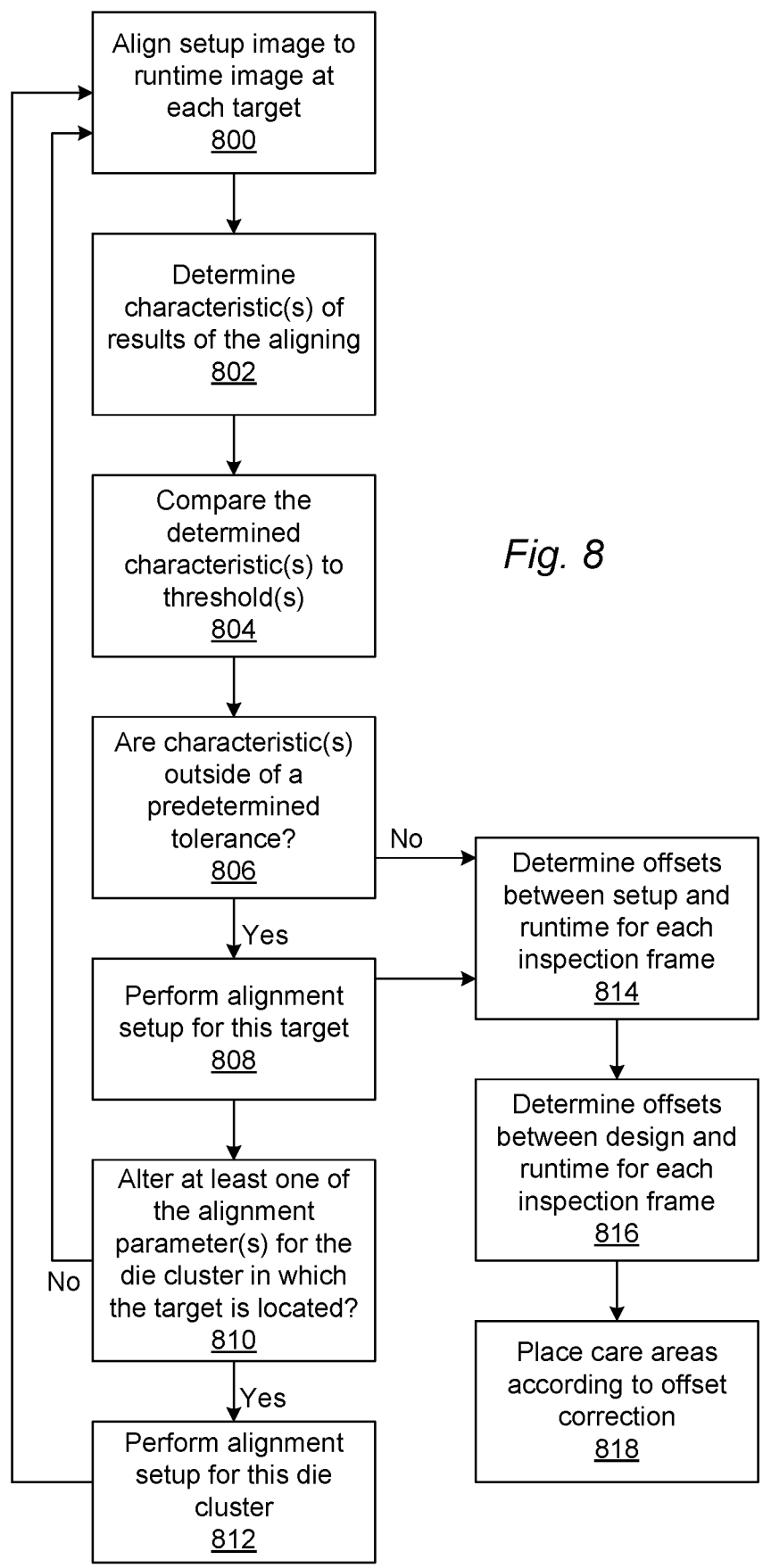

FIG. 8 illustrates another way that the alignment parameter(s) determined as described herein can be used during runtime with a PDA on the fly approach, in which the results of alignment are used to determine if modification(s) to the alignment parameter(s) should be made. In another embodiment, the aligning includes aligning the images generated for the specimen or the other specimen in the process to setup images using the one or more alignment parameters, determining one or more characteristics of results of the aligning for at least one of the images, and comparing the one or more characteristics to one or more thresholds, respectively.

In one such example, as shown in step 800 of FIG. 8, the one or more computer subsystems may align a setup image to a runtime image at each target, which may be performed as described further herein. In addition, the one or more computer subsystems may determine characteristic(s) of results of the aligning, as shown in step 802 of FIG. 8. In one such embodiment, the one or more characteristics of the results of the aligning include a normalized cross correlation (NCC) score. In another such embodiment, the one or more characteristics of the results of the aligning include a contrast change. For example, determining characteristic(s) of the results in step 802 may include calculating an NCC score and/or contrast change based on results of the aligning performed in step 800. Determining the NCC score and/or contrast change may be performed in any suitable manner known in the art.

The one or more computer subsystem(s) may also compare the determined characteristic(s) to threshold(s) for the characteristic(s), as shown in step 804 of FIG. 8. Different thresholds may be used for different characteristics depending on the characteristics. For example, a threshold for the NCC score may separate acceptable NCC scores from nonacceptable NCC scores. Therefore, NCC scores that are below the threshold may be outside of a predetermined tolerance for the NCC scores. In contrast, a threshold for contrast change may separate acceptable contrast changes that are below the threshold from nonacceptable contrast changes that are above the threshold. Therefore, contrast change values that are above the threshold may be outside of a predetermined tolerance for the contrast change.

In some such embodiments, the aligning also includes, when results of the comparing indicate the one or more characteristics of the results of the aligning for the at least one of the images are outside of a predetermined tolerance, altering at least one of the one or more alignment parameters used to align the at least one of the images to a corresponding one of the setup images. For example, as shown in step 806 of FIG. 8, the one or more computer subsystems may determine if the characteristic(s) are outside of a predetermined tolerance. For the characteristics described herein, the one or more computer subsystems may determine if the NCC score is below a threshold and/or determine if the contrast change exceeds a certain threshold. This determination may be performed for each target and/or each die cluster. In this manner, these calculations may be performed for any PDA database that has been generated for the layer of the specimen on which the process is being performed.

When the one or more computer subsystems determine that one or more of the characteristics are outside of their predetermined tolerance, the one or more computer subsystems may perform alignment setup for this target, as shown in step 808 of FIG. 8. The alignment setup performed for any one target may include performing PDA setup steps on the die in which the target is located, which deviates too much from setup. Such PDA setup may include generating a new simulated image from design that is compared to the specimen image. In this manner, a new PDA database may be created during run time inspection for each die that deviates from the setup die as measured by its NCC score and/or image contrast change compared to the setup die.

This embodiment would, therefore, benefit from design persistence for runtime rendering. In other words, as shown FIG. 6, the design that is acquired in step 604 for each target may be stored in step 614 with the setup alignment parameters such as targets and offsets so that the design is available at runtime for rendering new images for the targets when the alignment results indicate that there are deviations in the alignment performance from setup.

Any new alignment parameters, e.g., a PDA database, generated in this step may be applied to only the die for which they are generated. If another die on the specimen also has alignment results characteristic(s) that are outside of their predetermined tolerance, the alignment parameter determination may be separately performed for the other die. In this manner, the PDA setup may be adjusted on-the-fly for individual dies on the specimen based on the characteristics of the alignment results produced for each die. The alignment setup that is performed for any one target, die, or die cluster may otherwise be performed as described herein.

In a further such embodiment, the aligning includes, when results of the comparing indicate the one or more characteristics of the results of the aligning for the at least one of the images are within a predetermined tolerance, determining a runtime-to-setup offset based on results of the aligning the at least one of the images to a corresponding one of the setup images and determining a runtime-to-design offset based on the runtime-to-setup offset and an align-to-design offset. For example, when the one or more computer subsystems determine in step 806 that the characteristic(s) are not outside of their predetermined tolerance for any one or more alignment targets, the one or more computer subsystems may proceed with alignment for the inspection frames associated with those alignment target(s) by determining offsets between setup and runtime for each inspection frame, as shown in step 814, which may be performed as described further herein. The one or more computer subsystems may also determine offsets between design and runtime for each of those inspection frames, as shown in step 816, which may be performed as described further herein.

These steps may also be performed after the alignment setup is performed for any targets that were determined to have one or more characteristics outside of their predetermined tolerance. For example, if the one or more computer subsystems determine that an alignment results characteristic is outside of its predetermined tolerance for a target and perform alignment setup for this target, once the alignment setup has been performed for this target as shown in step 808 of FIG. 8, the one or more computer subsystems may then determine offsets between setup and runtime for each inspection frame associated with this alignment target, as shown in step 814 of FIG. 8, and determine offsets between design and runtime for each of those inspection frames, as shown in step 816 of FIG. 8. These steps will be performed with the new alignment parameter(s) determined in step 808, which may include setup alignment target image(s), offset(s), and any other alignment parameters described herein.

Adjusting alignment parameter(s) on the fly may be performed with die cluster-based alignment parameter(s) or one set of alignment parameters for all of the dies on the specimen. For example, the process may be performed as it normally would be without similarity measure determination and die clustering, and the same alignment parameter(s) may be assigned to each die and each target as is currently done. Then, the results of alignment performed at each (or at least one) of the dies can be examined as described above, e.g., by thresholding, to determine if the alignment was successful, i.e., within a predetermined tolerance for the alignment results characteristic(s). The alignment parameter(s) for any die having alignment results characteristic(s) outside of the predetermined tolerance can be adjusted and then alignment can be reperformed for that die with the adjusted alignment parameters.

This same process however may be used with die cluster-specific alignment parameter(s). For example, regardless of the alignment parameters that are used for an initial alignment of a runtime die image to a common reference image, whether they are alignment parameters for the whole specimen or only for a single die cluster on the specimen, the alignment parameter(s) can be adjusted on the fly as described herein. When the alignment parameter(s) are adjusted on the fly for a die that belongs to a die cluster, the adjusted alignment parameter(s) may be used for realignment of the images generated in just that one die. However, as described further herein, when alignment parameter(s) for a die are determined to be outside the predetermined tolerance, that can serve as an indication that the alignment parameter(s) for more than the one die should maybe be reexamined and possibly adjusted as described herein.

As described further herein, there may be multiple alignment targets for each die and each different die cluster. When alignment of the setup image to runtime image for any one target produces characteristic(s) that are outside of their predetermined tolerance, that may indicate a problem with only that one target or it may indicate that there are problems with the alignment parameter(s) for more than one target in the same die or the same die cluster. In this manner, when the alignment performed for one target is outside of its predetermined tolerance, the one or more computer subsystems may determine if at least one of the alignment parameter(s) for the die cluster in which the target is located should be altered, as shown in step 810. This step may involve examining the alignment results characteristics determined for at least two of the targets in the same die cluster. When the alignment results characteristics generated for two or more of the targets in the same die cluster exceed or even nearly exceed their predetermined tolerances, the computer subsystem(s) may determine that it would be advantageous to perform setup for all of the targets in the die cluster again. The one or more alignment results characteristics can in this manner also be used as a kind of monitoring tool to detect changes in the images generated of the specimen which can indicate a drift or change in the process(es) performed on the specimen, the performance of the imaging system, or any other changes that can cause the images of the specimen to be different enough from setup images to cause the alignment characteristics to be out of tolerance.

When the one or more computer subsystems determine that at least one of the alignment parameter(s) for the die cluster in which the target is located should be altered, the one or more computer subsystems may perform alignment setup for this die cluster, as shown in step 812 of FIG. 8. The alignment setup that is performed in step 812 may include any of the steps described herein for determining one or more alignment parameters. Once the new one or more alignment parameters have been determined, they may be stored as described herein and used the next time alignment is performed in step 800. When the one or more computer subsystems determine that at least one of the alignment parameter(s) for the die cluster in which the target is located do not need to be altered, then the one or more computer subsystems may proceed to performing step 800 for the next target in the queue.

In another such embodiment, the process also includes determining care areas in the images generated by the imaging system during the process performed on the specimen or the other specimen based on the runtime-to-design offset. For example, as shown in step 818 of FIG. 8, the one or more computer subsystems may place care areas according to offset correction, which may be performed as described further herein.

The embodiments described herein may also perform the process after the specimen has been aligned in runtime as described above. The computer subsystem(s) may be configured for storing information for the specimen generated by performing the process such as information for detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

Results and information generated by performing the processes described herein on the specimen or other specimens of the same type may be used in a variety of manners by the embodiments described herein and/or other systems and methods. Such functions include, but are not limited to, altering a process such as a fabrication process or step that was or will be performed on the specimen or another specimen in a feedback or feedforward manner. For example, the computer subsystem(s) may be configured to determine one or more changes to a process that was or will be performed on a specimen inspected as described herein based on the detected defect(s). The changes to the process may include any suitable changes to one or more parameters of the process. The computer subsystem(s) preferably determine those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem(s) may determine such changes in any suitable manner known in the art.

Those changes can then be sent to a semiconductor fabrication system (not shown) or a storage medium (not shown) accessible to the computer subsystem(s) and the semiconductor fabrication system. The semiconductor fabrication system may or may not be part of the system embodiments described herein. For example, the computer subsystem(s) and/or imaging system described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

Each of the embodiments of each of the systems described above may be combined together into one single embodiment.

Another embodiment relates to a computer-implemented method for determining one or more alignment parameters for use in a process performed on a specimen. The method includes the determining measures of similarity, performing cluster analysis, separately determining one or more alignment parameters, and storing steps described further herein. These steps are performed by one or more computer systems.

Each of the steps of the method may be performed as described further herein. The method may also include any other step(s) that can be performed by the system, computer system(s), and/or imaging system described herein. The computer system(s) may be configured according to any of the embodiments described herein, e.g., computer subsystem(s) 102. In addition, the method described above may be performed by any of the system embodiments described herein.

Figures 9, 10:
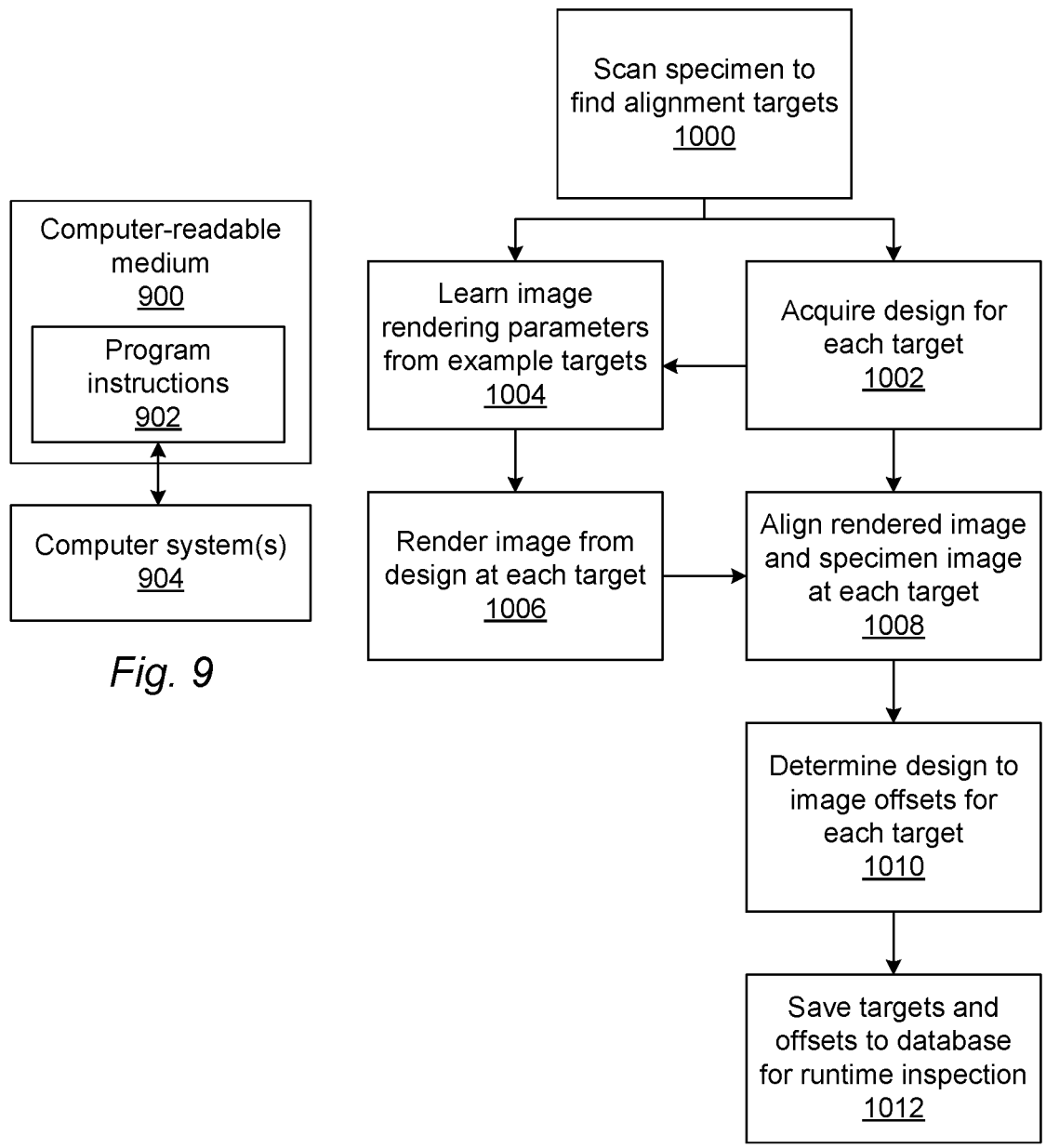
FIG. 9 is a block diagram illustrating one embodiment of a non-transitory computer-readable medium storing program instructions for causing computer system(s) to perform a computer-implemented method described herein.
FIG. 10 is a flow chart illustrating steps that may be performed by currently used systems and methods.

An additional embodiment relates to a non-transitory computer-readable medium storing program instructions executable on one or more computer systems for performing a computer-implemented method for determining one or more alignment parameters for use in a process performed on a specimen. One such embodiment is shown in FIG. 9. In particular, as shown in FIG. 9, non-transitory computer-readable medium 900 includes program instructions 902 executable on computer system(s) 904. The computer-implemented method may include any step(s) of any method(s) described herein.

Program instructions 902 implementing methods such as those described herein may be stored on computer-readable medium 900. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system(s) 904 may be configured according to any of the embodiments described herein.

Further modifications and alternative embodiments of various aspects of the invention will be apparent to those skilled in the art in view of this description. For example, methods and systems for determining one or more alignment parameters for use in a process performed on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured to determine one or more alignment parameters for use in a process performed on a specimen, comprising:
one or more computer subsystems configured for:
determining measures of similarity between images generated by an imaging system for corresponding locations in each of two or more pairs of dies on a specimen;
performing cluster analysis based on the determined measures of similarity to identify the images that are most similar to each other and to assign different subsets of the images that are most similar to each other to different die clusters, respectively;
for two or more of the different die clusters, separately determining one or more alignment parameters used for aligning images generated by the imaging system for the specimen or another specimen to a common reference; and
storing the one or more alignment parameters determined for the two or more of the different die clusters for use in a process performed on the specimen or the other specimen with the imaging system.

2. The system of claim 1, wherein the one or more computer subsystems are further configured for aligning the images generated by the imaging system for the corresponding locations to each other prior to determining the measures of similarity.

3. The system of claim 1, wherein the images for which the measures of similarity are determined comprise one frame image per each of the multiple dies.

4. The system of claim 1, wherein the measures of similarity are determined using a Pearson correlation of gray level intensity.

5. The system of claim 1, wherein the cluster analysis comprises an unsupervised learning technique.

6. The system of claim 1, wherein identifying the images that are most similar to each other comprises determining dissimilarity scores based on the measures of similarity, and wherein assigning the different subsets of the images to the different die clusters comprises generating a hierarchical clustering dendogram based on the dissimilarity scores and a threshold applied to the dissimilarity scores.

7. The system of claim 6, wherein the threshold is a user-defined threshold.

8. The system of claim 6, wherein the threshold is a cluster count threshold.

9. The system of claim 1, wherein the cluster analysis comprises hierarchical clustering, and wherein the hierarchical clustering comprises average linkage, single linkage, complete linkage, or centroid linkage.

10. The system of claim 1, wherein the cluster analysis comprises k-means clustering.

11. The system of claim 1, wherein separately determining the one or more alignment parameters comprises separately generating alignment target images for each of the two or more of the different die clusters.

12. The system of claim 1, wherein separately determining the one or more alignment parameters comprises separately determining align-to-design offsets for each of the two or more of the different die clusters.

13. The system of claim 1, wherein separately determining the one or more alignment parameters comprises separately determining one or more parameters for transforming first actual information for an alignment target on the specimen from a first type of information to a second type of information by inputting the first actual information into a deep generative model.

14. The system of claim 13, wherein when the first type of information is design data, then the second type of information is a specimen image.

15. The system of claim 13, wherein when the first type of information is a specimen image, then the second type of information is design data.

16. The system of claim 1, wherein the one or more computer subsystems are further configured for determining different subsets of the dies corresponding to the different subsets of the images assigned to the different die clusters, respectively, assigning the different subsets of the dies to the different die clusters, respectively, and storing information for locations of the different subsets of the dies on the specimen and the different die clusters to which the different subsets of the dies have been assigned for use in the process.

17. The system of claim 16, wherein the process comprises assigning test dies on the specimen or the other specimen to the different die clusters by comparing locations of the test dies on the specimen or the other specimen to the locations of the different subsets of the dies, assigning the one or more alignment parameters to the test dies based on the different die clusters to which the test dies are assigned, and performing said aligning the images generated for the specimen or the other specimen to the common reference using the one or more alignment parameters assigned to the test dies in which the images were generated in the process.

18. The system of claim 1, wherein said aligning comprises aligning the images generated for the specimen or the other specimen in the process to setup images using the one or more alignment parameters, determining one or more characteristics of results of said aligning for at least one of the images, and comparing the one or more characteristics to one or more thresholds, respectively.

19. The system of claim 18, wherein the one or more characteristics of the results of said aligning comprise a normalized cross correlation score.

20. The system of claim 18, wherein the one or more characteristics of the results of said aligning comprise a contrast change.

21. The system of claim 18, wherein said aligning further comprises, when results of said comparing indicate the one or more characteristics of the results of said aligning for the at least one of the images are outside of a predetermined tolerance, altering at least one of the one or more alignment parameters used to align the at least one of the images to a corresponding one of the setup images.

22. The system of claim 18, wherein said aligning further comprises, when results of said comparing indicate the one or more characteristics of the results of said aligning for the at least one of the images are within a predetermined tolerance, determining a runtime-to-setup offset based on results of said aligning the at least one of the images to a corresponding one of the setup images and determining a runtime-to-design offset based on the runtime-to-setup offset and an align-to-design offset.

23. The system of claim 22, wherein the process further comprises determining care areas in the images generated by the imaging system during the process performed on the specimen or the other specimen based on the runtime-to-design offset.

24. The system of claim 1, wherein the process is an inspection process.

25. The system of claim 1, wherein the imaging system is a light-based imaging system.

26. The system of claim 1, wherein the imaging system is an electron beam imaging system.

27. A non-transitory computer-readable medium, storing program instructions executable on one or more computer systems for performing a computer-implemented method for determining one or more alignment parameters for use in a process performed on a specimen, wherein the computer-implemented method comprises:
   determining measures of similarity between images generated by an imaging system for corresponding locations in each of two or more pairs of dies on a specimen;
   performing cluster analysis based on the determined measures of similarity to identify the images that are most similar to each other and to assign different subsets of the images that are most similar to each other to different die clusters, respectively;
   for two or more of the different die clusters, separately determining one or more alignment parameters used for aligning images generated by the imaging system for the specimen or another specimen to a common reference; and
   storing the one or more alignment parameters determined for the two or more of the different die clusters for use in a process performed on the specimen or the other specimen with the imaging system, wherein said determining the measures of similarity, performing the cluster analysis, separately determining the one or more alignment parameters, and storing the one or more alignment parameters are performed by the one or more computer systems.

28. A computer-implemented method for determining one or more alignment parameters for use in a process performed on a specimen, comprising:
   determining measures of similarity between images generated by an imaging system for corresponding locations in each of two or more pairs of dies on a specimen;
   performing cluster analysis based on the determined measures of similarity to identify the images that are most similar to each other and to assign different subsets of the images that are most similar to each other to different die clusters, respectively;
   for two or more of the different die clusters, separately determining one or more alignment parameters used for aligning images generated by the imaging system for the specimen or another specimen to a common reference; and
   storing the one or more alignment parameters determined for the two or more of the different die clusters for use in a process performed on the specimen or the other specimen with the imaging system, wherein said determining the measures of similarity, performing the cluster analysis, separately determining the one or more alignment parameters, and storing the one or more alignment parameters are performed by one or more computer systems.

* * * * *